Figure 4:
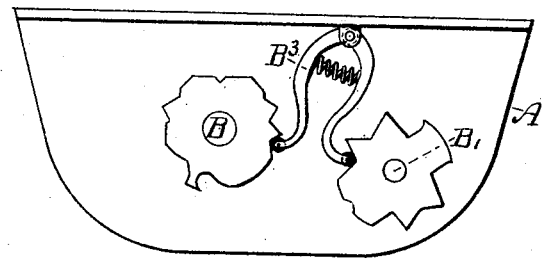

No. 665,350. Patented Jan. 1, 1901.
B. C. SHIPMAN.
ELECTRIC MOTOR CONTROL.
(Application filed Aug. 5, 1899.)
(No Model.) 4 Sheets—Sheet 1.

WITNESSES:
S. E. Clarkson
M. E. Sharpe.

INVENTOR
B. C. Shipman
BY
Geo. H. Parmelee
His ATTORNEY.

No. 665,350. Patented Jan. 1, 1901.
B. C. SHIPMAN.
ELECTRIC MOTOR CONTROL.
(Application filed Aug. 5, 1899.)
(No Model.) 4 Sheets—Sheet 2.
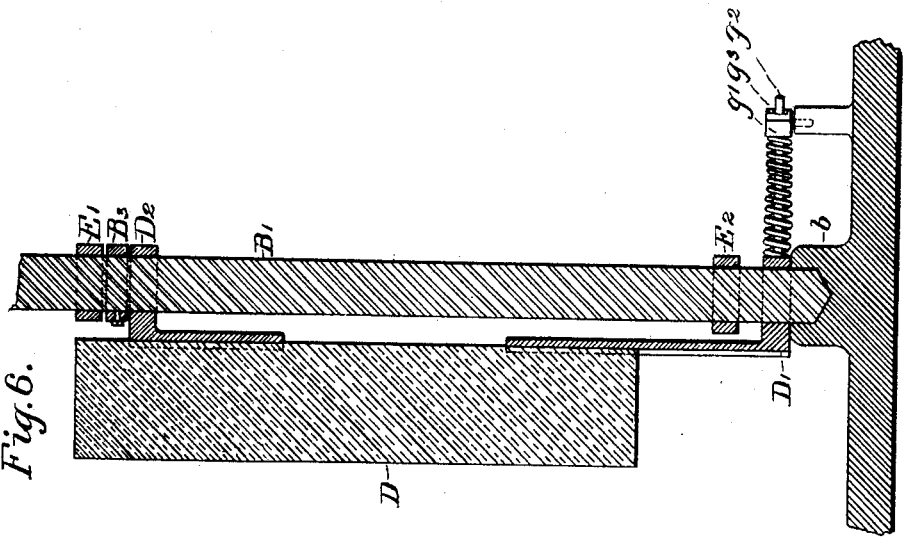
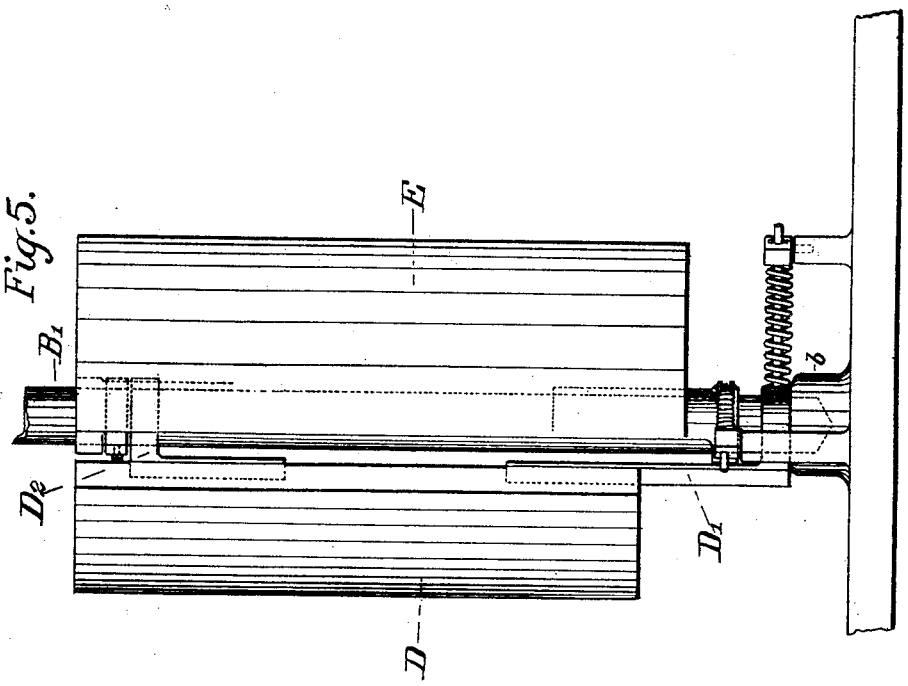
WITNESSES:
S. E. Clarkson
M. E. Sharke.
INVENTOR
B. C. Shipman
BY
Geo. H. Parmelee
his ATTORNEY.
THE NORRIS PETERS CO., PHOTO-LITHO., WASHINGTON, D. C.

No. 665,350. Patented Jan. 1, 1901.
B. C. SHIPMAN.
ELECTRIC MOTOR CONTROL.
(Application filed Aug. 5, 1899.)
(No Model.) 4 Sheets—Sheet 3.

WITNESSES:
S. E. Clarkson
M. E. Sharpe.

INVENTOR
B. C. Shipman
BY
Geo. H. Parmelee
his ATTORNEY.

No. 665,350. Patented Jan. 1, 1901.
B. C. SHIPMAN.
ELECTRIC MOTOR CONTROL.
(Application filed Aug. 5, 1899.)
(No Model.)
4 Sheets—Sheet 4.

WITNESSES:
J. E. Clarkson
M. E. Sharpie.

INVENTOR
B. C. Shipman
BY
Geo. H. Parmelee
his ATTORNEY.

UNITED STATES PATENT OFFICE.

BENNET CARROLL SHIPMAN, OF JOHNSTOWN, PENNSYLVANIA, ASSIGNOR TO THE LORAIN STEEL COMPANY, OF PENNSYLVANIA.

ELECTRIC-MOTOR CONTROL.

SPECIFICATION forming part of Letters Patent No. 665,350, dated January 1, 1901.

Application filed August 5, 1899. Serial No. 726,340. (No model.)

*To all whom it may concern:*

Be it known that I, BENNET CARROLL SHIPMAN, of Johnstown, in the county of Cambria and State of Pennsylvania, have invented a new and useful Improvement in Electric-Motor Control, of which the following is a full, clear, and exact description, reference being had to the accompanying drawings, which form a part of this specification.

My invention relates to electric systems of control, and is especially adapted to control the acceleration and regulate the speed of electric-railway motors.

The principal object of my invention is to provide a practicable method by which I can attain most of the well-known advantages of series motors and yet attain the most important of the equally well-known advantages of shunt-motors; and to this end my invention consists in the novel method and means by which I use the motors as series motors in starting them from their position of rest and changing them over to shunt-motors after they have reached a certain speed. To attain this purpose and yet work the motors practically and with a reasonable efficiency at all times, I employ a motor having different sets of field-windings, which in the starting positions are arranged in multiple with each other and in series with the armatures; but in the positions of higher speed these different field-coils are placed in series with each other and in shunt to the armature. This arrangement makes it possible to provide the proper field excitation without either abnormally increasing the size of the motors or, vice versa, without too much heating of the field-coils at any time, while at the same time the wiring of the field-coils can be arranged so that the motor will be working efficiently, whether it is being operated as a series or a shunt motor. With my preferred arrangement I provide a multipolar motor and connect the terminals of each of the coils for the respective poles to my switching apparatus, whereby the coils for the different poles may be all in series when the motor is to be used as a shunt-motor, whereas they will be all in multiple when the motor is to be used as a series motor. This, however, is not essential to my invention, as I may attain this purpose by having multiple windings on the same cores, if I desire, and, indeed, this construction may for some forms of motors—as, for example, a bipolar motor—be preferable.

Another portion of my invention consists in certain more specific features, both in the process of control which I employ, including the various accelerating and regulating steps. The nature of these features will appear more fully hereinafter when describing the detailed arrangement shown in the drawings.

Figure 1:
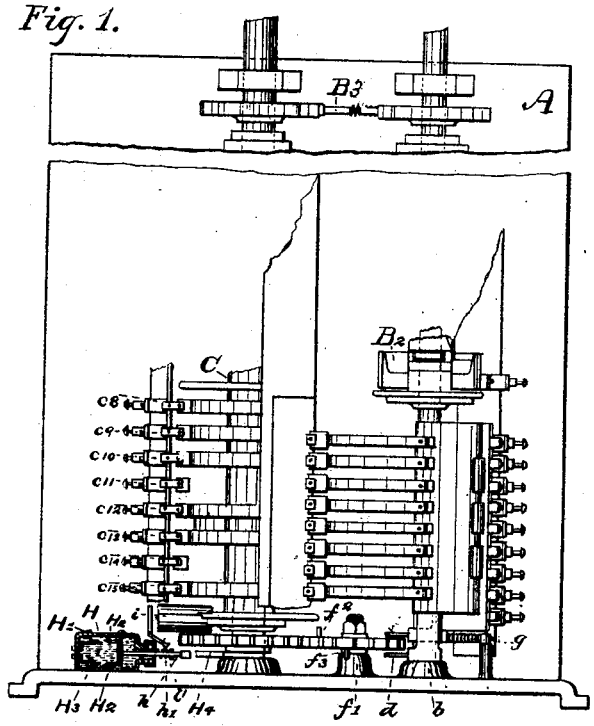
Figure 2:
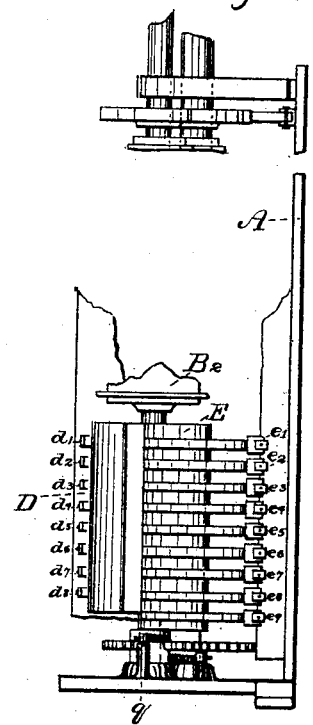
Figure 3:
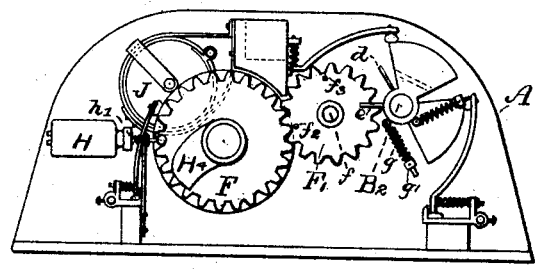
Figure 7:
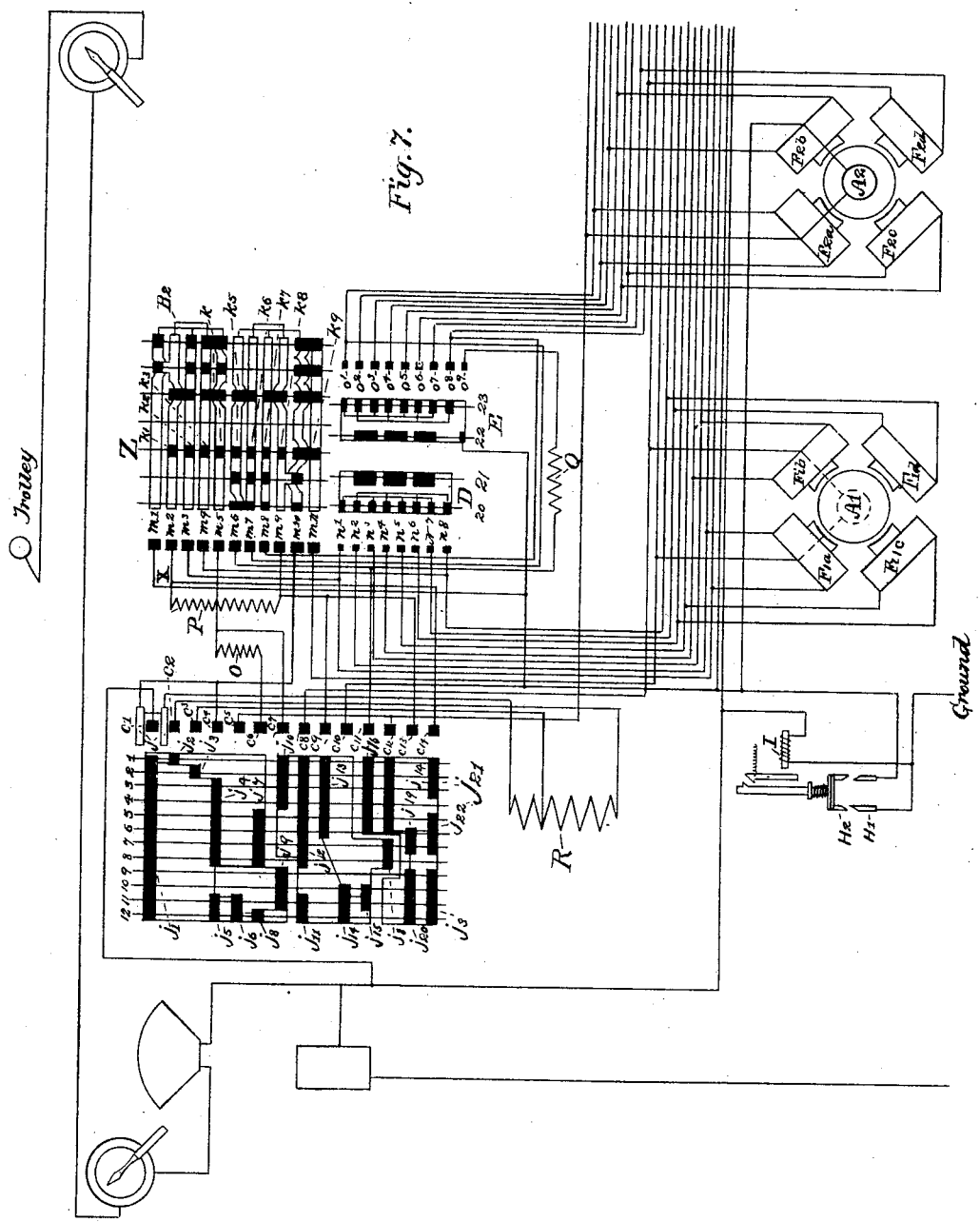
Figure 8:
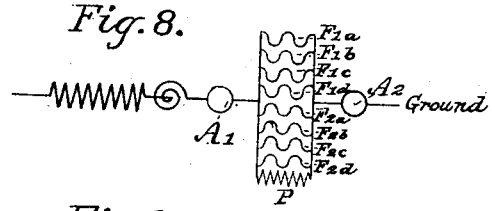

Referring to the drawings, Figure 1 is a front elevation of a controller constructed in accordance with my invention, portions of the same being broken away to more clearly show the novel parts of the apparatus. Fig. 2 is a side elevation of a similar character. Fig. 3 is an inverted plan view of Fig. 1 with the base of the controller-casing removed. Fig. 4 is a plan view of the interlocking and step-by-step device. Fig. 5 is an enlarged view of portions of the field-commutating switches. Fig. 6 is a vertical section of Fig. 5. Fig. 7 is a diagrammatical representation of the circuits; and Figs. 8 to 20, inclusive, are diagrammatical representations of the most important of the combinations effected by the operation of the controller.

A represents the controller-casing, parts only of which are shown in the different views, the remainder of the casing being removed to more clearly show the construction of the different switches.

B is the shaft of the ordinary control-drum and is mounted in the usual bearings at the top and bottom of the controller-casing.

C represents the control-drum, which carries contact-segments which engage with a number of fixed contact-fingers C'. The construction of the controller-drum and the contact-fingers is of the usual type and need not be further considered.

B' represents the shaft of the reversing-switch. A portion of the drum of the reversing-switch is shown at B² in Figs. 1 and 2; but this also is of the usual type of construction. The shaft B' is mounted in the usual bearings in the top of the controller-casing and is extended from the lower end of the reversing-switch B² to a suitable bearing b on the base of the controller-casing. The lower part of this shaft is used to carry loosely mounted upon it the segments D and E of the field commutating-switches with which the contact-fingers d', d², &c., to d³ and e', e², &c., to e⁸ engage, respectively. B³ indicates the interlocking and step-by-step device, which is also of a known type. The moving portion of the field commutating-switch D is a segment having secured to it a sleeving-lug D', Fig. 6, which rests upon the top of the bearing-block b. This sleeving-lug supports the segment D thereon, a second sleeving-lug D² being provided, which holds the said segment to its proper center. The segment E of the other field commutating-switch has similar sleeving-lugs E' and E², the former resting on a collar B³, secured to the shaft B', while the latter, E², corresponds in function to the sleeving-lug D². The field commutating-switches have two positions, and they are moved from one to the other of the operating positions at predetermined positions of the control-drum C, the instrumentalities for effecting this change being as follows:

Upon the shaft B of the control-drum is rigidly mounted a gear-wheel F, Figs. 1, 2, and 3, which rotates with the shaft B. This gear F meshes with a smaller gear F', carried by a short shaft f, mounted in a bearing f' on the base of the controller-casing. Projecting upwardly and downwardly from the gear F' are pins f² and f³, respectively.

Projecting from the sleeving-lug D' are arms d, which are in the line of movement of the pin f³, and projecting from the sleeving-lug E² are arms e, which are adapted to be engaged by the pin f². When the controller is at a predetermined position, pin f³ engages one of the arms d, thereby turning the segment D about the shaft B as a center, and in order that the movement shall be a quick and positive one I provide a spring g, bearing at one end against the sleeving-lug D' and at its other end against a small pivoted block g', Fig. 6, a rod g² being connected to the sleeving-lug D' and passing through the spring and pivot-block g', the range of movement being limited by a cotter-pin g³. When the segment D is moved past the center, this spring, against the action of which the pin f³ at first operates, acts upon the sleeving-lug D', so that the segment D is thrown to its extreme position. In other words, the spring g will act to either side of a position central to the two operative positions of the switch. In the reverse movement of the control-drum the pin f³ will act upon the second of the arms d to exactly reverse its operation and return segment D to its first position. At another position of the controller pin f² will act upon one of the arms e to actuate the segment E in the same manner and by the aid of spring connections similar to those I have just described.

Although it forms no part of the present invention, in order to show a complete apparatus such as I prefer to employ I have illustrated a safety device whereby the circuit to the controller is automatically opened when the main circuit is interrupted from any cause and is kept open until the controller is turned to off position. This device consists, essentially, of a switch, an electromagnet energized by the main circuit or a shunt from the main circuit, so as to maintain the switch closed when the magnet is energized, and a part moving with the control-switch and adapted to close the switch and maintain it closed when the control-switch is at the off position. The preferred form which I show (see particularly Figs. 1 and 3) is constructed as follows:

A vessel H contains the stationary switch-terminals H' and the moving switch-terminals H², all of said terminals being preferably immersed in oil H³ or an equivalent arc-extinguishing material. This vessel H is preferably hermetically sealed by any suitable means. The movable terminals H² are carried on the end of a piston h, the end of which is in line of movement of a cam H⁴, which is movable with the shaft B of the control-switch. This cam H⁴ engages with the end of the piston h only when the controller is at the off position. By this arrangement if the switch automatically opens when the controller is in an operative position it will not be closed until the operator has turned his handle to the off position, and in case of a continued failure of the main circuit it will at once open again as soon as the cam H⁴ leaves the end of the piston h, so that the operator's attempt to actuate the motors when the main circuit is still interrupted will do no damage. The means for thus opening the switch when the main circuit is interrupted and the cam H⁴ is out of engagement with the piston is a compression-spring h'.

I is an electromagnet whose energizing-coil is, preferably, a shunt from the main circuit, as clearly shown in Fig. 7. Whenever this magnet attracts the armature i, it engages the collar i' on the piston h when the terminals H' and H² are in engagement. So long, therefore, as the main circuit is uninterrupted the pivoted armature i will maintain the closure of the switch by overcoming the tendency of the spring h' to open the same. Many of the ordinary forms of magnetic circuit-breakers may be used in this connection instead of the specific form which I have shown, the novelty in my safety device consisting in its combination with the control-switch in the manner set forth, so that the latter automatically closes the switch when at the off position, though having no effect upon the switch at any other position. At J, I have indicated an electromagnetic blow-out, which, however, does not form any part of the present invention. This blow-out, as shown, comprises two parallel coils (see Fig. 7) arranged above and below the first contact-finger c' of the control-switch, the arcing on the control-switch when the point X is connected to the finger $c^{14}$, so that on the third group of $j$ contacts the eight branch circuits are reunited, leaving by the finger $c^{12}$, passing through armature $A^2$, through terminals H' and $H^2$, to ground. It will thus be seen that the current is passed through the two armatures in series with each other and through the eight field-coils and a supplementary resistance which are in multiple with each other, but in series with the armatures, while the main resistance R is in circuit, as well as the blow-out J. I may change this, however. The reason I have preferred to provide the resistance P in multiple with the eight field-coils is that it is a very simple method of obtaining proper field strength and efficiency, both when the motors are used as series motors and as shunt-motors, because the resistance can be graduated so as to suit any given conditions.

Figure 9:
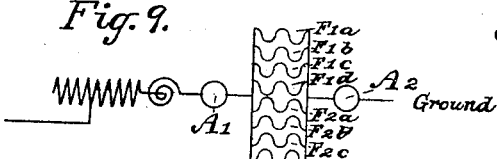

At position 2 of the control-switch the only change effected is that the current passes from contact $j'$ to contact $j^3$ instead of contact $j^2$, whereby a portion of resistance R is cut out. This is shown in Fig. 9.

Figure 10:
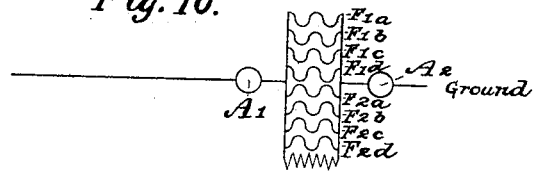

At position 3 of the control-switch the circuit passes from $j'$ to $j^4$ and cuts out the remaining portion of the resistance, thereby producing the combination shown in Fig. 10.

Figure 11:
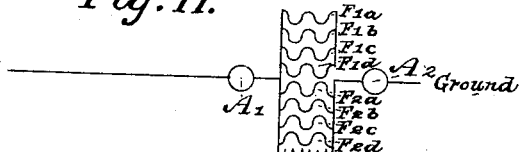

At position 4 of the control-switch finger $c^{14}$ breaks contact with contact $j^{21}$, all the other connections remaining the same. The only result of this is that the circuit between the negative side of F', field-coils, and armature $A^2$ and between the negative side of resistance P and $A^2$ is broken, so that we have the resultant effect, as shown in Fig. 11, in which only one motor—viz., the right-hand motor—is doing useful work, although the ohmic resistance of A' is in circuit. This is preferably a pass-over or reorganization position.

Figure 12:

The next change is made by one of the field commutating-switches before the control-switch leaves its position, for it is at this point that pin $f^3$ engages one of the triggers $d$, whereby the segment D is thrown so that the contacts on line 21 engage fingers $n^2$ to $n^7$, inclusive. The effect of this change, it will be clearly seen, is to place the four field-coils $F'^a$, $F'^b$, $F'^c$, and $F'^d$ in series with each other. As this is a very transitory step and as in practice it will take place substantially simultaneous with the step which I will now describe, I have not shown it in a separate diagram. About the time, therefore, that this change is made, position 5 of the control-switch is reached, at which finger $c^6$ engages with contact $j^7$, finger $c^7$ breaks engagement with $j^{10}$, and finger $c^{14}$ makes engagement with $j^{22}$. The result of these changes is that a shunt is established from contact $j'$ to contact $j^7$, to finger $c^6$, through resistance O, finger $m^5$, contact $k^4$, contact $k^2$, finger $m^3$ to field-coil $F'^a$, through the fields in series, because the $n$ fingers are on line 21 of segment D, thence through finger $m^4$, contact $k^3$, contact $k'$, finger $m^2$, finger $c^{14}$, contact $j^{22}$ to contact $j^{17}$, and finger $c^{12}$ to armature $A^2$ and ground, as before. This combination is shown in Fig. 12, in which it will be seen that one motor is acting as a shunt-motor with a resistance in circuit with its field, while the other motor is a series motor, the resistance P being again in multiple with its low-resistance field. The negative side of the shunt-field is connected to the negative side of the series field, so as to insure a rapid building up of the shunt-motor. This also is preferably a transitory position.

Figure 13:
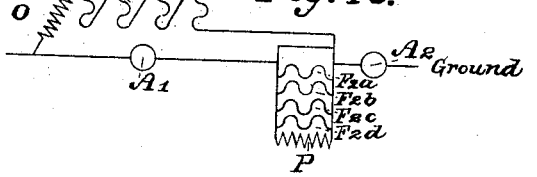

The next change is effected at the position 6 of the control-switch, the only change being that finger $c^{13}$ engages contact $j^{19}$. This effects a short circuit of the field-coils $F^{2a}$, $F^{2b}$, $F^{2c}$, and $F^{2d}$ and resistance P by the connection from $c^9$ to $c^{13}$, $j^{19}$ and $j^{16}$ to finger $c^{11}$. This is shown in Fig. 13 as another transitory position at which the car is operated by the shunt-motor only, except that the ohmic resistance of the other armature is in circuit.

Figure 14:
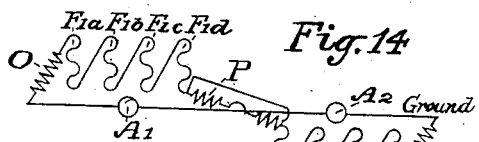

In passing from position 6 of the control-switch to position 7 thereof pin $f^2$ engages one of the triggers $e$, so that the segment E is moved and the $o$ fingers are upon line 22 of segment E. Also changes are made on the control-switch, because finger $c^9$ loses engagement with contact $j^{13}$. Finger $c^{11}$ loses engagement with contact $j^{16}$, and finger $c^{12}$ loses engagement with $j^{17}$ and makes engagement with contact $j^{18}$. The effect of these changes is shown in Fig. 14, which is a running position. These changes may be summarized as follows:

First. Field-coils $F^{2a}$, $F^{2b}$, $F^{2c}$, and $F^{2d}$ are placed in series with each other, and this is of course affected by the movement of segment E. This same movement places in series with the field-coils the resistance Q, which is connected to finger $o^9$, which is connected by segment E to ground.

Second. It removes the short circuit across the $F^2$ field-coils, thereby placing F' and $F^2$ field-coils in series with each other, and this it does because of the disengagement of fingers $c^9$ and contact $j^{13}$, which are the means previously present for short-circuiting the field.

Third. It maintains the connection between the two armatures even though the short circuit of the field is removed, because finger $c^{12}$ engages contact $j^{18}$, which by means of contact $j^{12}$ is in connection with finger $c^8$, fingers $c^8$ and $c^{12}$ being connected to the opposite terminals of the two armatures. At this position the resistance P though connected in series between the two fields is short-circuited by the fact that $c^{13}$ and $c^{14}$ are connected together by contacts $j^{19}$ and $j^{22}$.

Figure 15:
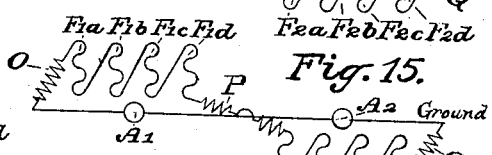

The only change made by passing to position 8 of the control-switch is shown in Fig. 15, when the short circuit around the resistance P is removed, so that the strength of the shunt-fields is weakened. This short circuit is removed, because fingers $c^{13}$ and $c^{14}$ are no longer connected by any of the $j$ contacts. It breaking the circuit being concentrated at this point, so as to be acted upon by a strong concentrated magnetic field.

Turning now to Fig. 7, in which such of the parts which I have referred to in previous descriptions as are here shown are marked with the same reference-letters which I have heretofore used, $k'$ to $k^9$, inclusive, represent the contact-points of the circuit of the reversing and cut-out switch $B^2$ as would be used at the position "go ahead with both motors." This combined reversing and cut-out switch does not differ in principle from that disclosed in the patent to Gustaf Valley, No. 561,839, dated June 9, 1896, and I will therefore not need to describe its construction and operation in detail. It has two positions at which both motors may be used—one in the forward direction and one in the reverse direction—while it has four other positions in which one motor alone may be used in an emergency either in the forward or backward direction. When one motor is cut out, I prefer to use the control-drum only in the first three of its positions and never use the motor as a shunt-motor. For the purpose, therefore, of describing the novel features of my method it may be assumed that the fingers $m'$ to $m^{11}$, inclusive, are bearing on the line Z of the reversing and cut-out drum, so that the fingers $m^2$ to $m^{11}$, inclusive, are bearing on the contacts $k'$ to $k^9$, inclusive, the interconnections between the latter contacts being clearly shown on the diagram.

$j'$ to $j^{23}$, inclusive, represent the contacts projecting from the drum C of the control-switch, said contacts being interconnected in three groups, the first group including $j'$ to $j^9$, inclusive, the second group $j^{10}$ to $j^{15}$, inclusive, and $j^{19}$, and the third group $j^{16}$, $j^{17}$, and $j^{19}$ to $j^{23}$, inclusive. These contacts engage the fixed contact-fingers $c'$ to $c^{14}$, inclusive, in the usual manner, the latter being connected to the different parts of the circuit, as shown.

The armatures of the two motors are represented as $A'$ and $A^2$. The field-coils in my preferred arrangement comprise four field-coils each for one of the cores of the field-magnet. The field-coils of one motor are represented as $F'^a$ $F'^b$ $F'^c$ $F'^d$, while those of the other motors are represented as $F^{2a}$, $F^{2b}$, $F^{2c}$, and $F^{2d}$.

$n'$ to $n^8$, inclusive, represent the stationary contact-fingers for the segment D of one of the field commutating-switches, while $o'$ to $o^9$, inclusive, represent the fixed contact-fingers for the segment E of the other of the commutating-switches. Each of these segments, as clearly shown in Fig. 7, has a double row of contacts, one of which is adapted to connect the fingers, which are in turn connected with the field-coils of one of the motors, so as to place all the coils in series, while the others are adapted to place all the coils in multiple.

R represents a resistance which I prefer to use at the first two positions of the control-switch to allow for starting the motors in their position of rest in the old rheostatic manner. These positions, however, are not particularly material to my invention and with some motors might readily be dispensed with.

O, P, and Q are three resistances of smaller capacity and higher resistance than resistance R, and these I use in connection with the control of the field-strength and the changes of the coupling of the various filled coils, as hereinafter described.

The current from the "trolley" enters through various canopy switches and the ordinary safety devices carried by an electric-railway car to the fingers $c'$ of the control-drum. The various ground connections from the system pass through the terminals $H'$ of my safety-switch, as clearly shown.

In the first position of the control-switch the contacts $c'$ to $c^{14}$, inclusive, are bearing on the line 1 of the control-drum development, the fingers $n'$ to $n^8$, inclusive, are bearing on the line 20 of segment D, fingers $o'$ to $o^8$, inclusive, are bearing on the line 23 of segment E, and the terminals $H'$ and $H^2$ of safety-switch are closed. The condition of the motors and apparatus while at this position is shown clearly in Fig. 8. The current from the trolley enters at $c'$, passes by contacts $j'$ and $j^2$ to finger $c^2$, thence through resistance R to blow-out coil J, thence to finger $m^{10}$, contact $k^9$, finger $m^{11}$, armature $A'$, finger $c^8$, and contact $j^{12}$. At this point the current divides, going through the eight field-coils of the two motors in multiple and also through the resistance $p$ in multiple. The circuit from $j^{12}$ through the field-coils $F'^a$, $F'^b$, $F'^c$, and $F'^d$ is by means of contact $j^{10}$, finger $c^7$, finger $m^5$, contact $k^4$, contact $k^3$, finger $m^4$, from which there is one direct connection to field-coil $F'^d$, and one connection by finger $n^8$, which by means of the connection of the contacts on line 20 of segment D effects the connections of the other field-coils $F^b$ $F'^c$ $F'^a$ by means of the fingers $n^8$ $n^6$ $n^4$ $n^2$, the return connections from said coils being made to the fingers $n'$, $n^3$, $n^5$, and $n^8$, the several fingers being connected, as shown, by the contacts on the line 20. The circuit is then to finger $m^3$, to contacts $k^2$ $k'$, to finger $m^2$ to the point which for convenience I have marked $x$. The circuit through the four field-coils of the other motor and through the resistance P from the contacts $j^{12}$ to the point I have marked $x$ is from contact $j^{12}$ to contact $j^{13}$, finger $c^9$, directly through resistance P to X, and also to finger $m^9$, contacts $k^8$ and $k^6$, finger $m^7$ to finger $o'$ of switch E to coil $F^{2a}$, finger $o'$ being connected by the contacts on line 23 of said switch E to fingers $o^3$, $o^5$ and $o^7$, respectively, which are connected to the positive sides of coils $F^{2b}$, $F^{2c}$, and $F^{2d}$, respectively. The other sides of these coils are connected, respectively, to fingers $o^2$, $o^4$, $o^6$, and $o^8$, which are connected together by the contacts on line 23, so that from the fingers $o^8$ the current for this branch of the circuit passes to finger $m^8$, contact $k^7$, contact $k^5$, finger $m^6$, finger $c^{11}$, while may be noted at this point that both the positions shown in Figs. 14 and 15 may be used as running positions, the only difference being in the strength of the fields.

Figure 16:
Figure 17:
Figure 18:

Fig. 16 while not, strictly speaking, one of the indicated positions of the controller, has been shown in a separate figure, because it represents a momentary change of considerable importance in the manipulation of an effective system of this kind. This figure represents a condition of the circuit which arises when the fingers $c'$ to $c^{14}$ are between positions 8 and 9 of the control-switch, so that the fingers are bridging. At this position fingers $c'$, $c^4$, $c^6$, $c^7$, $c^8$, $c^{12}$, and $c^{13}$ and $c^{14}$ are respectively in engagement with contacts $j'$, $j^4$, $j^9$, $j^{12}$, $j^{18}$, $j^{20}$, and $j^{23}$. The effect of these changes, as will be readily seen without detailed information, is to short-circuit resistances O and P, so that the field strength of the motors will be suddenly increased, thereby increasing the counter electromotive force, so that when an instant later the circuit through the armatures is broken by disengagement of fingers $c^4$, $c^8$, and $c^{12}$, and contacts $j^4$, $j^{12}$, and $j^{18}$, respectively, the increased counter electromotive force will tend to reduce the current flowing or in some conditions even supply a small counter-current, so as to prevent arcing on the controller-contacts. This position is shown at Fig. 17, which I prefer to use only as a transitory position.

At the next position (position 10, shown in Fig. 18) the only change made is a short-circuit of resistance Q, which is effected by engagement of fingers $c^{10}$ and $c^{11}$ with contacts $j^{14}$ and $j^{15}$. This is preparatory to putting the motors into multiple as shunt-motors, and as this change is a radical one the field strength is to be at its maximum.

Figure 19:
Figure 20:

Position 11 is the first multiple position, and it is shown in Fig. 19. At this position finger $c^4$ makes contact with $j^5$, reëstablishing the circuit to A', while finger $c^5$ makes contact with contact $j^6$, thus connecting $A^2$ directly to trolley and in multiple with A'. At the same position $c^8$ engages with $j^{11}$, by which means the connection is made from the negative side at A' to ground though contact $j^{14}$ and finger $c^{10}$.

The next and last position (position 12, shown in Fig. 20) reintroduces resistances O and Q into the field-circuit, whereby the field strength is decreased, and consequently the counter electromotive force of the motors is also decreased, so that a higher speed may be attained.

The method which I have herein described makes it possible to combine the advantages of series and shunt motors, as will be readily seen, and provides a very efficient system of control. The provision of the auxiliary resistances and their manipulation in circuit, in conjunction with the changes in connection of the field-coil windings from multiple to series and in connection with the subsequent changes in the motor-circuit, enables the field strength to be accurately controlled to meet the varying conditions of the circuit and the running requirements. I do not, however, limit myself to the details of the system which I have described, it being obvious that intermediate and less important steps of the method may be considerably varied or that new steps may be introduced to secure more gradual changes in circuit connections without in any way departing from the spirit and scope of my invention. It is also obvious that certain steps in the method and minor connections thereof which I believe to be new may be used to advantage in other systems of control differing as a whole from that herein described.

The novel apparatus herein shown and described forms the subject-matter of a divisional application, Serial No. 18,387, filed May 29, 1900.

Having thus described my invention, what I claim, and desire to protect by Letters Patent, is—

1. The herein-described method of controlling the speed and acceleration of electric motors, consisting in placing the field-winding and armature in series with each other and then shifting the circuits of the field-windings to increase their ohmic resistance and simultaneously placing said field-windings in shunt to the armature.

2. The method of accelerating electric motors which consists in changing the field-magnet windings from a low to a high resistance winding and substantially simultaneously therewith shifting it from in series with the armature to in shunt with the same.

3. The method of accelerating an electric motor, which consists in starting the motor from rest as a series motor and then changing it to a shunt-motor having its field-magnet resistance increased substantially in proportion with the increased voltage across its terminals.

4. The method of accelerating an electric motor which consists in first placing its armature in series with its fields, and subsequently increasing the resistance of said fields and connecting them in shunt with the armature.

5. The method of accelerating electric motors having different sets of field-coil windings, which consists in starting the motors with their armature-coils in series with each other and with the fields and the field-windings in multiple with each other, and subsequently placing the field-windings in series with each other and in shunt with the armatures.

6. The method of accelerating electric motors having different sets of field-coil windings which consists in first placing the field-windings and armatures in series with each other and then shifting the connections of the fields to increase their ohmic resistance and placing them in shunt to the armature, and finally connecting the armatures in parallel.

7. The method of accelerating a pair of electric motors each of which has different sets of field-windings, which consists in starting the motors with the fields and armatures in series with each other, and the field-windings in multiple with each other and with resistance, then placing the field-magnet coils in series with each other and with resistance, and in shunt to the armatures.

8. The method of accelerating an electric motor, which consists in starting it with its different field-windings in series with its armature and in multiple with each other and then changing the connections of the field-windings to place them in series with each other and shifting them to in shunt with the armature, and further controlling the field strength by utilizing resistance in circuit.

9. The method of accelerating electric motors, which consists in starting the motors with the field-windings and armatures in series and with resistance in shunt to the field-windings, then placing the resistance in series with the field-windings and the latter in shunt to the armature.

10. The method of accelerating electric motors, which consists in starting the motors with the field-coils and armature in series and the field-coil windings in multiple to each other and with resistance, then shifting the connections of the field-windings to place them in series with each other and in shunt with the armature, and then increasing the field strength by removing the resistance.

11. The method of controlling electric motors, which consists in starting them with their field-coils and armatures in series with each other and the field-coil windings in multiple with each other, then placing the field-windings in series with each other and in shunt to the armatures, then increasing the strength of the fields, and then connecting the armatures in multiple.

12. The method of controlling electric motors, which consists in starting them with their field-coils and armatures in series with each other and the field-coil windings in multiple with each other, then placing the field-coil windings in series with each other, and in shunt to the armatures, then increasing the strength of the fields, then connecting the armatures in multiple, and finally decreasing the field strength.

13. The method of controlling electric motors, which consists in starting them as series motors, then changing them to shunt-motors and substantially simultaneously therewith increasing the resistance of their fields proportionately to the increased voltage across their terminals, then increasing the strength of the fields and then placing the motors in multiple as shunt-motors.

14. The method of controlling electric motors, which consists in starting them as series motors, then changing them to shunt-motors, and substantially simultaneously therewith increasing the resistance of their fields proportionately to the increased voltage across their terminals, then increasing the strength of the fields and then placing the motors in multiple, and finally decreasing the field strength of the motors.

15. The method of accelerating electric motors having a plurality of field-windings, which consists in starting the motors as series motors with their field-windings in multiple, then connecting the field-windings in series and placing them in multiple with the armature, then decreasing the strength of the shunt-fields and then connecting the motors in multiple.

16. The method of accelerating electric motors having a plurality of field-windings, which consists in starting the motors as series motors with their field-windings in multiple with each other and with resistance, then shifting the circuit connections of the field-windings to place them in series with each other and with resistance, then increasing the effective resistance in circuit with said field-windings, then increasing the field strength by removing the resistance, then connecting the armatures in multiple with the fields still in shunt, and finally introducing resistance in series with the field-windings to decrease the field strength.

17. The method of accelerating electric motors, which consists in starting the motors as series motors with low field resistance, then changing them to shunt-motors with high field resistance, substantially as described.

18. The method of accelerating electric motors, which consists in starting the motors as series motors with low field resistance, then changing the motors to shunt-motors with high-field resistance, then decreasing the field resistance and connecting the motors in multiple, and finally again increasing the field resistance.

19. In a system of control for electric motors, the method which consists in starting the motors as series motors with the field-windings in multiple with each other and with resistance, then connecting the field-windings of one motor in series with each other, and with the resistance, and in shunt to its armature.

20. In a system of control for electric motors, the method of control which consists in starting the motors as series motors, with the field-windings in multiple with each other and with resistance, then connecting the field-windings of one motor all in series with each other and with the resistance and in shunt to the armature, the field-windings of the other motor remaining in multiple with each other and in series with its armature.

21. In a method of accelerating electric motors, having different sets of field-windings the herein-described steps consisting in starting with the armatures and field-coils connected in series with each other and with the field-coil windings in multiple with each other and with artificial resistance, then connecting the field-windings of one motor in shunt to its armature, and connected in series with each other, with the negative side of the shunt-field connected to the negative side of the other or series field.

22. In a method of accelerating electric motors having different sets of field-windings, the herein-described steps which consist in starting with the field-coils connected in series with each other and with the armatures, and the field-coil windings in multiple with each other and with resistance, then changing the circuit connections of the field-coil windings of one motor to increase their resistance and placing them in shunt to the armature, with the negative side thereof connected to the negative side of the series-multiple field-windings of the other motor, then short-circuiting the multiple-connected windings and connecting them in series with each other and in shunt to their armature.

23. In a system of control for electric motors having different sets of field-windings, the herein-described method of changing the motors from a position wherein their armatures are in series and their field-windings in shunt to the armatures and in series to each other and with resistance, to a position wherein the armatures are in multiple to each other and to the field-windings, which consists in first short-circuiting the resistance whereby to increase the field strength and thereby the counter electromotive force, then momentarily breaking the circuit through the armatures, and then connecting the armatures in multiple.

24. In a system for controlling electric motors having a plurality of field-windings, the method of changing the field resistance as the motors are changed from series to shunt motors, which consists in starting with the field-windings in multiple with each other and subsequently connecting the field-windings of each motor successively in series with each other as the motors are changed to shunt-motors.

25. The method of accelerating a pair of electric motors having different sets of field-windings, which consists in starting them with their fields and armatures in series with each other and with artificial resistance and the windings of the fields in multiple with each other, gradually cutting out the resistance and then shifting the field-coil windings to connect them in series with each other, then shifting the field-coils to in shunt with the armature, and then connecting the armatures in multiple.

26. In a system for controlling electric motors, the method of varying the field resistance in changing the motors from series to shunt motors, which consists in first connecting the field-windings in multiple with each other and with artificial resistance, then shifting the connections to throw the field-windings into series with each other and with the resistance, and subsequently alternately increasing and decreasing the strength of the said fields by manipulation of the resistance as the armatures are connected in parallel.

27. In a system for controlling electric motors, the method of shifting the motors from series to shunt motors, which consists in connecting the field-windings of the motors in multiple with each other and with resistance, and in series with the armatures, then changing the connections of the field-windings of one motor to connect them in series with each other and with resistance and shifting them to in shunt with the armatures of that motor, and at the same time connecting their negative side to the negative side of the field-windings of the other motor, then short-circuiting the field of the last-named motor, and connecting its field-windings in series with each other and with those of the first motor, and also shifting them to in shunt with their armature.

28. The method of accelerating a pair of electric motors having each a plurality of field-coil windings and regulating the speed thereof, which consists in starting the motors as series motors with their field-windings all connected in multiple with each other and with artificial resistance, then connecting the field-coil windings of one motor in series with each other and with resistance and with the negative side thereof connected to the negative side of the multiple-connected field-coil windings of the other motor and in shunt to their armature, then short-circuiting the said multiple-connected windings and connecting them in series with each other and with resistance and in shunt to their armature, then temporarily decreasing the ohmic resistance of the field-coil circuit, and subsequently increasing such resistance and breaking the circuit through the armatures, then connecting the armatures in parallel and finally again increasing such resistance.

In testimony whereof I have affixed my signature in presence of two witnesses.

BENNET CARROLL SHIPMAN.

Witnesses:
H. W. ROOT,
N. ASPINWALL.